US008855609B2

(12) United States Patent
Olivier et al.

(10) Patent No.: US 8,855,609 B2
(45) Date of Patent: Oct. 7, 2014

(54) USER INTERFACE FOR SELECTIVELY PLAYING BACK CONTENT OF A FORWARDED MESSAGE

(75) Inventors: Steve Olivier, Seattle, WA (US); Alan Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 12/862,172

(22) Filed: Aug. 24, 2010

(65) Prior Publication Data

US 2012/0052845 A1    Mar. 1, 2012

(51) Int. Cl.
    *H04M 3/42*     (2006.01)
    *H04M 3/493*     (2006.01)
    *H04L 29/06*     (2006.01)
    *H04M 3/533*     (2006.01)
    *H04M 3/537*     (2006.01)

(52) U.S. Cl.
    CPC .... *H04M 3/53333* (2013.01); *H04M 2203/252* (2013.01); *H04M 2203/301* (2013.01); *H04M 3/537* (2013.01); *H04M 3/42042* (2013.01); *H04M 2203/303* (2013.01)
    USPC ..................... 455/412.2; 455/412.1; 455/413; 455/415

(58) Field of Classification Search
    CPC ... H04M 3/53; H04M 3/533; H04M 3/53333; H04M 3/42042; H04M 2303/252; H04M 2203/253; H04M 2203/301; H04M 2203/4518; H04M 2203/4545
    USPC ............................ 455/412.1, 412.2, 413, 415
    See application file for complete search history.

(56) References Cited

U.S. PATENT DOCUMENTS

| | | | |
|---|---|---|---|
| 7,092,735 B2 | 8/2006 | Osann, Jr. | |
| 7,149,777 B1 * | 12/2006 | Rhee | 709/206 |
| 7,917,591 B2 * | 3/2011 | Vakkalanka | 709/206 |
| 2007/0147681 A1 * | 6/2007 | Van De Sluis | 382/190 |
| 2008/0220752 A1 * | 9/2008 | Forstall et al. | 455/415 |
| 2009/0055484 A1 * | 2/2009 | Vuong et al. | 709/206 |
| 2009/0075631 A1 * | 3/2009 | Lyle et al. | 455/412.2 |
| 2009/0119678 A1 * | 5/2009 | Shih et al. | 719/313 |
| 2011/0205231 A1 * | 8/2011 | Hartley et al. | 345/440 |

OTHER PUBLICATIONS

AVST, "Effective Messaging Delivered Through Video", Product Description, 2010; http://www.avst.com/products/videomail.asp.
"User Guide for the Cisco Unity Connection Phone Interface", Cisco Systems, Inc., 2010, pp. 5-14.

* cited by examiner

*Primary Examiner* — Wesley Kim
(74) *Attorney, Agent, or Firm* — Tucker Ellis LLP

(57) ABSTRACT

Disclosed in an example embodiment herein is an apparatus comprising a user interface, and a controller coupled to the user interface. The controller is operative to display images associated with a message that has been forwarded at least once in a predefined format on the user interface, where a first image is associated with the original sender of the message. A first image is associated with the original sender of the message, and an additional image is associated with a party forwarding the message. The controller is operative to receive an input associated with the user interface indicating a selection of a displayed image, and plays back content added to the message by a party associated with the selected image.

20 Claims, 3 Drawing Sheets

USER INTERFACE FOR SELECTIVELY PLAYING BACK CONTENT OF A FORWARDED MESSAGE

TECHNICAL FIELD

The present disclosure relates generally to audio and/or video communications systems such as voice mail systems.

BACKGROUND

In a voice mail system, a voice mail for a first recipient may be forwarded to a second recipient. In addition to forwarding the original message, the first recipient may add a voice annotation, e.g., an introduction or comment, before sending to the second recipient. When the second recipient listens to the message, the second recipient listens to both the original message and the voice annotation. This process can be repeated where a message can be forwarded multiple times, where each time a message is forwarded a voice annotation may be added.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
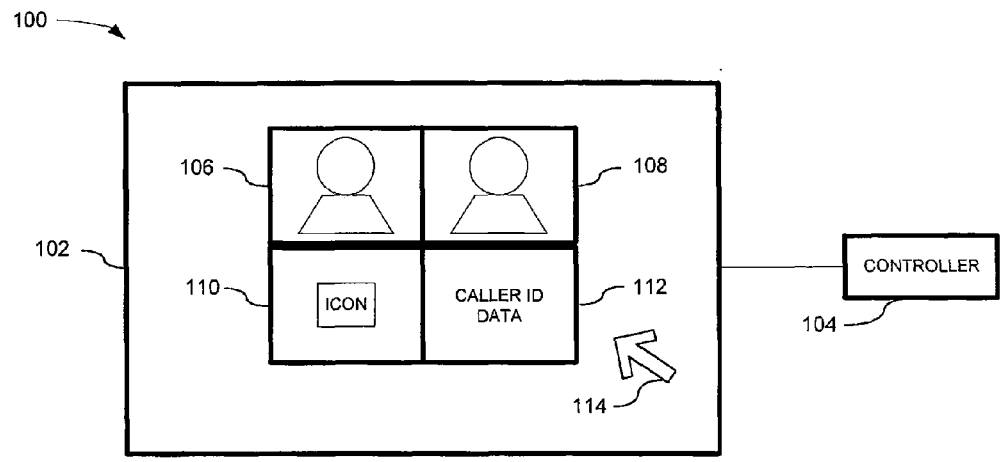
FIG. 1 illustrates an example of a system with a user interface that outputs images associated with a forwarded message in a grid format.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a user interface, and a controller coupled to the user interface. The controller is operative to display images associated with a message that has been forwarded at least once in a predefined format on the user interface, where a first image is associated with the original sender of the message, and an additional image is associated with a party forwarding the message. The message comprises content from the original sender of the message and content associated with a party forwarding the message. The controller is operative to receive an input via the user interface indicating a selection of a displayed image to play back content in the message associated with the selected image.

In accordance with an example embodiment, there is disclosed herein a method that comprises displaying for a message that was forwarded at least once, an image for the original sender of the message and an additional image corresponding to a party forwarding the message each time the message was forwarded in a predefined format. A selection of an image corresponding to one of a group consisting of the original sender of the message and a party forwarding the message is received and content in the message associated with the selected image is played back.

In accordance with an example embodiment, there is disclosed herein, logic encoded in at least one tangible media for execution by at least one processor and when executed operative to display for a message that was forwarded at least once, an image for the original sender of the message and an additional image corresponding to a party forwarding the message each time the message was forwarded in a predefined format. The logic is further operative to receive an input indicative of a selection of an image corresponding to one of a group consisting of the original sender of the message and a party forwarding the message, and play back content in the message associated with the selected image.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a user interface is disclosed for displaying voice messages and/or video messages (with audio) that have been forwarded. For example, if a message has been forwarded multiple times, a representation of each user forwarding the message, such as caller identification (ID) data, an icon, a photograph, or a frame from a video portion of the message is displayed in a video output device in a grid format. This enables a user of a device to select a user and listen to the selected user's comments without having to play the entire message back. This can also enable a user to playback introductory comments added by users forwarding a message in any order and/or to skip comments added by certain users.

In an example embodiment, a thumbnail of each individually forwarded introduction to a (video/voice) mail message is displayed in a grid format. Some "basic" video viewers may simply play all of the forwarded introductions concatenated together starting with the first introduction. More sophisticated video viewers would offer the ability for a user to select a thumbnail, e.g., using an input device such as a mouse and/or using a touchscreen. Choosing a thumbnail within the grid would play the introduction associated with the selected thumbnail, and in particular embodiments, may play the remaining introductions in the sequence. The example embodiments described herein are suitably adaptable to any video device capable of playing a video message such as a desktop computer, video phone, personal digital assistant, mobile device, etc.

FIG. 1 illustrates an example of a system 100 a user interface 102 that outputs images associated with a forwarded message in a grid format. Controller 104 is coupled to the user interface and is operative to display images on user interface 102. In an example embodiment, controller 104 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

The forwarded message suitably comprises original content from the original sender, or creator, of the message. The content may include audio data, video data, which may contain textual and/or image data, or audiovisual data. Each time the message is forwarded, the party forwarding the message may add additional content.

Controller 104 associates an image with the party (for example a person or a group of persons) that created and/or originally sent the message, and with each party that forwarded the message. For example image 106 may be a frame from audiovisual content of the message. Image 108 illustrates an example of a photograph linked to the party forwarding (or sending) the message. Image 110 illustrates an example of an icon associated with the party forwarding (or sending) the message. Image 112 illustrates an example of an image that suitably comprises caller identification (ID) data associated with the party forwarding (or sending) the message.

The images associated with the message may be displayed in any desired format. For example, Image 106 may be associated with the party creating the message and images 108, 110, 112 with parties forwarding the message, or alternatively, image 112 may be associated with the party creating the message and icons 110, 108, 106 with parties forwarding the message. Moreover, although the illustrated example shows four parties (one creating the message and three forwarding the message), those skilled in the art should readily appreciate that the number of parties in this example was selected merely for ease of illustration as the number of parties forwarding the message may be as few as one, or any physically realizable number.

Figure 2:
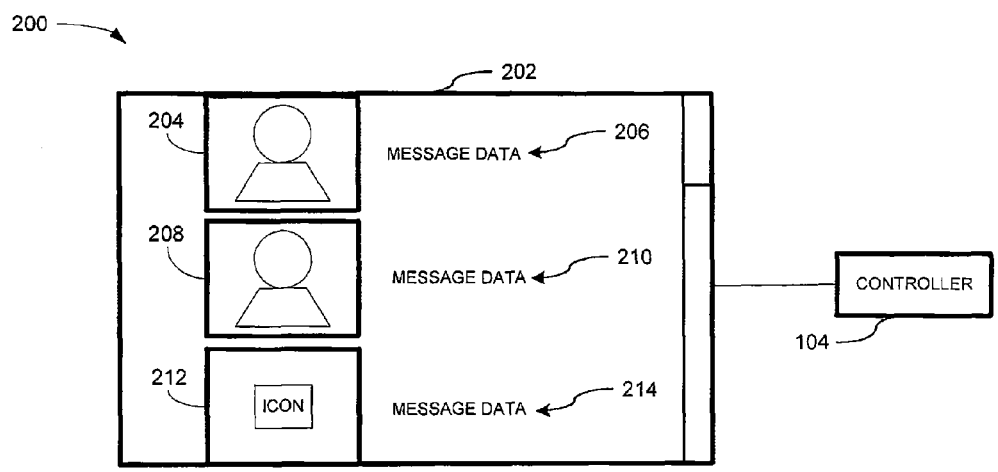
FIG. 2 illustrates an example of a system with a user interface that outputs images associated with a forwarded message in a list format.

Referring to FIG. 2 with continued reference to FIG. 1, there is illustrated an alternative embodiment. System 200, which comprises user interface 202 outputs the images of parties associated with the message in a list format. As illustrated, an image 204, and message data 206 (such as for example, caller ID data, time, date message was created/forwarded, length of content, etc) is displayed for a first person an image 208, and message data 210 with a second person, and an image 212 and message data 214 associated with a third person that either created and/or forwarded a message (note it is possible a person forwarding the message may forward it to the original creator/sender of the message who may add additional content to the message before forwarding the message).

In an example embodiment, controller 104 is operative to receive an input via user interface 102 or 202 indicating a selection of a displayed image. In an example embodiment, the selection may be made by an input device 114 such as a mouse or stylus. In another example embodiment, for example where user interface 102 or 202 is a touchscreen; the selection may be made by touching an area of the user interface corresponding to the desired image.

In response to the selection, controller 104 outputs the content in the message that is associated with the selected image. In an example embodiment, controller 104 plays back only the content associated with the selected image. In another example embodiment, the controller plays back content associated with the selected image and the remaining content in sequence, e.g., if five people forwarded a message and the third person was selected, the content of the third, second, and first parties forwarding the message, and the content of the creator of the message would be played back in sequence.

In an example embodiment, the message is a voice mail message. In yet another example embodiment, the message is a video voice mail message. As those skilled in the art can readily appreciate, the message content may suitably comprise any type of audio, video or audiovisual data.

Figure 3:
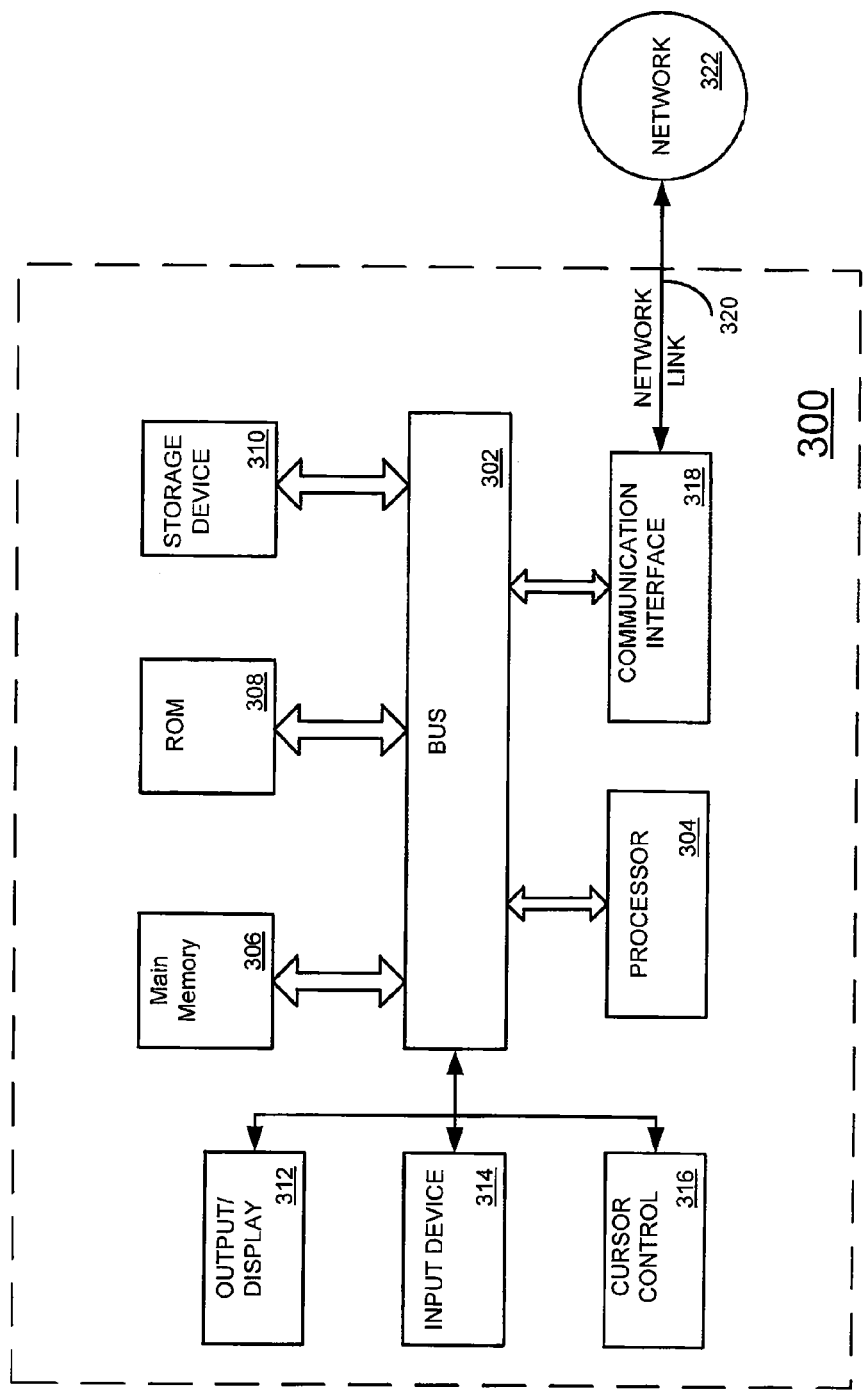
FIG. 3 illustrates an example of a computer system upon which an example embodiment may be implemented.

FIG. 3 illustrates an example of a computer system 300 upon which an example embodiment may be implemented. Computer system 300 is suitable for implementing the logic associated with controller 104 (FIGS. 1 and 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to an output device 312, which may include a display such as a cathode ray tube (CRT) or liquid crystal display (LCD), for displaying information to a computer user. The output device may also comprise an audio output such as a speaker and/or a vibrating device. An input device 314, such as a keyboard including alphanumeric and other keys is coupled to bus 302 for communicating information and command selections to processor 304. Another type of user input device is cursor control 316, such as a mouse, a trackball, cursor direction keys, and/or a touchscreen for communicating direction information and command selections to processor 304 and for controlling cursor movement on display 312. This input device typically has two degrees of freedom in two axes, a first axis (e.g. x) and a second axis (e.g. y) that allows the device to specify positions in a plane.

An aspect of the example embodiment is related to the use of computer system 300 for selectively playing back content of a forwarded message. According to an example embodiment, selectively playing back content of a forwarded message is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to a network link 320 that is connected to a network 322. Communication interface 318 may be any appropriate device for connecting to network 322. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

In an example embodiment, computer system 300 receives forwarded messages via network 322. The message can be stored in storage device 310 and/or main memory 306. Processor 304 may also obtain image data for parties creating and forwarding the message from network 322 via communication interface 318, main memory 306, and/or storage device 310. Processor 304 would then display images associated with the creator of the message and parties forwarding the message on display 312. Upon receipt of a selection, e.g., via input device 314, processor 304 plays back the appropriate message content.

Figure 4:
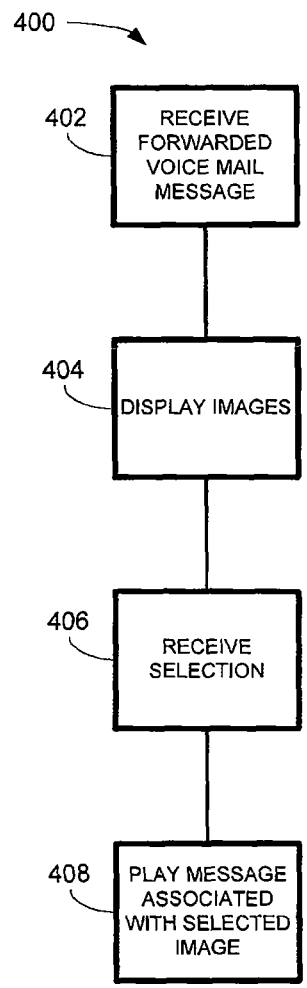
FIG. 4 illustrates an example of a methodology for facilitating selective play back a forwarded message.

In view of the foregoing structural and functional features described above, a methodology 400 in accordance with an example embodiment will be better appreciated with reference to FIG. 4. While for purposes of simplicity of explanation, methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. Methodology 400 described herein is suitably adapted to be implemented in hardware, software, or a combination thereof.

At 402, a message, such as a voice mail message in the illustrated example, is received. The voice mail message may also include video content. The voice mail message has been forwarded at least once.

At 404, images are displayed corresponding to the party that created the voice mail message and parties that forwarded the message. In an example embodiment, an image is displayed for each party that forwarded the message, and in at least one embodiment, for each time the party forwarded the message. The images are displayed in a predefined format, such as a grid or list. The order of parties creating and forwarding the message determine where images are displayed. For example, the party creating the message may be displayed first, followed by the first party forwarding the message, etc., or as another example, the party creating the message may be displayed last and the last party forwarding the message is displayed first.

At 406, a selection is received. In an example embodiment, the selection is made by selecting an image corresponding to either the original creator of the message or a party that forwarded the message.

At 408, the content in the message associated with the selected image is played back. In an example embodiment, only the content associated with the selected image is played back. In another example embodiment, content associated with the selected image and content associated with each party forwarding the message prior to the party associated with the selected is played back in sequence of forwarding until reaching content associated with the original sender. For example, if five people forwarded the message, and the second person forwarding the message was selected, the controller would play back the content for the second person forwarding the message, the content for the first person forwarding the message, and the content of the original message created by the party creating the message. The message content may include an audio data stream, a video data stream, and/or an audiovisual data stream.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a user interface;
    a controller coupled to the user interface;
    wherein the controller is operative to receive a message inclusive of audiovisual content;
    wherein the controller is operative to retrieve from the audiovisual content a first graphical image comprised of a captured image of an original sender of the message and an additional graphical image comprised of a captured image of a party forwarding the message;
    wherein the controller is operative to display the first graphical image associated with the message that has been forwarded at least once in a defined format on the user interface, where the first graphical image is associated with the original sender of the message, and the additional graphical image is associated with a party forwarding the message, and the message comprises a voice message from the original sender of the message and a voice annotation corresponding to the voice message supplied by the party forwarding the message;
    wherein the controller is operative to display a thumbnail of at least one message associatively with a corresponding graphical image;
    wherein the controller is operative to display an indicator relative to length of content of at least one message;
    wherein the controller is operative to receive an input via the user interface indicating a selection of a displayed graphical image; and wherein the controller plays back content in the message associated with the selected graphical image.

2. The apparatus set forth in claim 1, wherein the controller plays back only the content associated with the selected graphical image.

3. The apparatus set forth in claim 1, wherein the controller plays back content associated with the selected graphical image and remaining content in sequence.

4. The apparatus set forth in claim 1, wherein at least one of the first graphical image and additional graphical image comprises caller identification data.

5. The apparatus set forth in claim 1, wherein at least one of the first graphical image and additional graphical image further comprises an icon.

6. The apparatus set forth in claim 1, wherein at least one of the first graphical image and additional graphical image comprises a photograph.

7. The apparatus set forth in claim 1, wherein the message is further comprised of video content and at least one of a likeness of the original sender and a likeness of the party forwarding the message are obtained from a frame from a video of the content.

8. The apparatus set forth in claim 1, wherein the message is a voice mail message.

9. The apparatus set forth in claim 1, wherein the message is a video voice mail message.

10. The apparatus set forth in claim 1, wherein the message was forwarded a plurality of times; and wherein a graphical image and content is associated with each forwarding of the message.

11. The apparatus as set forth in claim 1, wherein the thumbnail is comprised of an audio message.

12. The apparatus as set forth in claim 1, wherein the thumbnail is comprised of a video message.

13. The apparatus set forth in claim 1 further comprising the controller operative to receive at least a third graphical image comprised of an icon associated with a third party forwarding the message, and wherein the display further displays the third graphical image and associated caller identification data for the third party.

14. A method, comprising:
receiving a message including audiovisual content;
receiving, from the audiovisual content, a first graphical image comprised of a captured image associated with a sender of an original transmitted voice message and an additional graphical image of a captured image of each of a plurality of parties forwarding the message;
displaying for the message that was forwarded at least once in a defined format, the graphical image of the original sender of the message and the additional graphical image of each party forwarding the message each time the message was forwarded, where the message comprises content associated with the original sender of the message and content associated with the party forwarding the message;
displaying a thumbnail of at least one message associatively with a corresponding graphical image;
displaying an indicator relative to length of content of at least one message;
receiving a selection of a graphical image corresponding to one of a group consisting of the original sender of the message and the party forwarding the message; and
playing back content in the message associated with the selected graphical image.

15. The method of claim 14, wherein only content associated with the selected graphical image is played back.

16. The method of claim 14, wherein content associated with the selected graphical image and each party forwarding the message prior to the party associated with the selected graphical image is played back in sequence of forwarding until reaching content associated with the original sender.

17. The method of claim 14, wherein the content is selected from a group consisting of an audio data stream, a video data stream, and an audiovisual data stream.

18. The method of claim 14, wherein the thumbnail is comprised of a multimedia message.

19. Logic encoded in at least one tangible, non-transitory media for execution by at least one processor and when executed operative to:
receive a message including audiovisual content;
receive, from the audiovisual content, a first graphical image comprised of a captured image of a sender of an original transmitted voice message and an additional graphical image of a captured image of each of a plurality of parties forwarding the message;
display for the message that was forwarded at least once in a defined format, the graphical image and caller identification data for the original sender of the message and the additional graphical image along with caller identification data corresponding to each party forwarding the message each time the message was forwarded;
display a thumbnail of at least one message associatively with a corresponding graphical image;
display an indicator relative to length of content of the at least one message;
receive an input indicative of a selection of a graphical image corresponding to one of a group consisting of the original sender of the message and a party forwarding the message; and play back content in the message associated with the selected graphical image.

20. The logic of claim 19, wherein the logic is further operative to display the thumbnail as a multimedia message.

* * * * *